United States Patent
Dagh

(10) Patent No.: US 7,618,195 B2
(45) Date of Patent: Nov. 17, 2009

(54) WHEEL BEARING ARRANGEMENT

(75) Inventor: Ingemar Dagh, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 11/164,154

(22) Filed: Nov. 11, 2005

(65) Prior Publication Data

US 2007/0014502 A1    Jan. 18, 2007

Related U.S. Application Data

(63) Continuation of application No. PCT/SE2004/000725, filed on May 12, 2004, now abandoned.

(30) Foreign Application Priority Data

May 12, 2003    (SE) .................................... 0301363

(51) Int. Cl.
F16C 13/00    (2006.01)
F16C 33/76    (2006.01)

(52) U.S. Cl. ................... 384/589; 384/477; 384/482; 277/345

(58) Field of Classification Search ............... 384/482, 384/485, 544, 589, 477, 484, 571, 462, 607; 277/273–375, 377
See application file for complete search history.

(56) References Cited

U.S. PATENT DOCUMENTS

| | | | | |
|---|---|---|---|---|
| 2,015,206 A | * | 9/1935 | Tyson | 384/487 |
| 2,479,968 A | * | 8/1949 | Schick | 277/375 |
| 3,006,701 A | * | 10/1961 | Curtis | 384/485 |
| 4,919,551 A | | 4/1990 | Nunotani et al. | |
| 5,044,782 A | * | 9/1991 | Jankowski | 384/482 |
| 5,642,946 A | | 7/1997 | Caillault et al. | |
| 6,739,757 B2 | * | 5/2004 | Kai et al. | 384/488 |

FOREIGN PATENT DOCUMENTS

| | | | |
|---|---|---|---|
| EP | 807763 A1 | * | 11/1997 |
| JP | 56105118 A | | 8/1981 |
| JP | 04160225 A | * | 6/1992 |
| JP | 08270662 A | * | 10/1996 |
| JP | 10078037 A | * | 3/1998 |
| JP | 11247862 A | * | 9/1999 |

(Continued)

OTHER PUBLICATIONS

Patent Abstracts of Japan, vol. 0051, No. 83, Nov. 21, 1981, JP 56105118 A (Koy Seiko Co Ltd), abstract , details 15, 19.

(Continued)

*Primary Examiner*—Marcus Charles
(74) *Attorney, Agent, or Firm*—Novak Druce + Quigg LLP

(57) ABSTRACT

A bearing arrangement having a roller bearing having an inner race, bearing rollers, and an outer race in which the roller bearing is arranged to support a wheel hub on a wheel axle. The bearing arrangement further includes a first seal and a second seal which have been arranged on either side of the bearing rollers, wherein closed bearing spaces are delimited between the first seal and the bearing rollers, and between the second seal and the bearing rollers. The bearing arrangement is provided as a complete, sealed, preassembled unit.

11 Claims, 1 Drawing Sheet

| | FOREIGN PATENT DOCUMENTS | | | |
|---|---|---|---|---|
| JP | 11257359 | A | * | 9/1999 |
| JP | 11336773 | A | * | 12/1999 |
| JP | 2000249154 | A | * | 9/2000 |
| JP | 2001234937 | A | * | 8/2001 |
| JP | 2001254745 | A | * | 9/2001 |
| WO | 9742425 | A2 | | 11/1997 |

OTHER PUBLICATIONS

International Search Report for International Patent Application PCT/SE2004/000725, dated Jun. 23, 2004.

* cited by examiner

WHEEL BEARING ARRANGEMENT

CROSS-REFERENCE TO RELATED APPLICATIONS

The present application is a continuation patent application of International Application No. PCT/SE2004/000725 filed 12 May 2004 which was published in English pursuant to Article 21(2) of the Patent Cooperation Treaty, and which claims priority to Swedish Application No. 0301363-8 filed 12 May 2003. Said applications are expressly incorporated herein by reference in their entireties.

TECHNICAL FIELD

The present invention relates to a bearing arrangement including a roller bearing with an inner bearing race and bearing rollers and an outer bearing race. The roller bearing is utilized for supporting a wheel hub on a wheel axle and the invention has a main application in bearing assemblies for wheel axles of heavy commercial motor vehicles.

The invention further relates to a wheel axle arrangement for vehicles that has a wheel axle, a wheel hub and an inner roller bearing and an outer roller bearing for supporting a wheel hub on a wheel axle. The inner roller bearing includes a first inner bearing race, a first outer bearing race and a first set of bearing rollers. Further, the outer roller bearing has a second inner bearing race, a second outer bearing race and a second set of bearing rollers.

BACKGROUND OF THE INVENTION

In connection with motor vehicles, different types of bearings are utilized for supporting the wheels on respective wheel axles. In heavier commercial vehicles, the rear wheels may be carried on bearings on the rear axle of the vehicle by means of two roller bearings mounted next to each other. Conventionally, these roller bearings are arranged side-by-side so that they bear on each other. The roller bearings are kept together in an unmounted condition by means of a bearing ring, which is substantially annular and arranged on the rear axle.

Within the internal surfaces of the inner races of the bearings (i.e. on the surfaces which are constituted by the inside of the inner races and the outside of the rear axle itself), a thin layer of oil must be supplied for corrosion protection of the bearings and the rear axle. This oil is successively supplied via the interior of the rear axle and is conducted in between the peripheral surface of the rear axle and the inner side of each respective roller bearing. Furthermore, traditionally the roller bearings themselves are lubricated by bearing grease. This bearing grease is applied when assembling the roller bearings and is retained on the bearing rollers and bearing races by means of seals.

In the patent publication WO 97/42425, a known arrangement is provided with a sealing device that is intended to be mounted in connection with a roller bearing on a rear axle of a vehicle. In actual fact, the arrangement is intended for solving a problem that arises as a consequence of a small gap that forms between the inner races of the two roller bearings. This gap entails a risk that the layer of oil present between the inner sides of the roller bearings and the rear axle will penetrate through the gap when the vehicle is running. This problem may be solved by means of the arrangement according to WO 97/42425.

It is also known that a wheel hub for commercial vehicles, for instance according to what is disclosed in WO 97/42425, is designed to facilitate assembly in connection with the manufacturing of the vehicle. A wheel hub is usually dimensioned and designed so that it will remain operable during the entire life of the vehicle, that is, corresponding to a mileage of 800,000 km (approximately 500,000 miles) or more. A precondition for this is that the vehicle is driven according to set regulations and for example is not subjected to a higher load than the guidelines set out for each respective type of vehicle. If a heavy commercial vehicle is frequently subjected to excessively heavy loads or is otherwise driven in an unsuitable way, for example in a difficult environment or under much too hard driving conditions, there is a risk that the wheel hubs and the components making up the wheel hubs may be damaged and need to be repaired or replaced. However, such operations are complicated, whereby damage on components making up the wheel hub often requires replacement of the entire wheel hub, which of course is expensive. This demand for the replacement of an entire wheel hub (that is instead of repairing it) is in particular caused by the requirements for high standards with respect to cleanness, sealing properties and quality of the wheel hub. These standards must be maintained even after such an operation. Individual components of a wheel hub are therefore not always easily replaceable.

It may also be noted that when assembling a wheel hub of a conventional type, the outer ring of the respective bearing is usually mounted first. Then the inner ring is mounted with a conical bearing. This type of assembly requires a very high degree of cleanness so that there is no risk of penetration of impurities and a reduced function of the wheel hub.

In those cases where it is not desired to replace an entire wheel hub but only replace certain components, for instance one of the hub bearings, it is necessary that this can be done in a simple and cost effective manner. Even after the replacement of a certain component it is desirable to maintain high standards with respect to cleanness and quality of the wheel hub.

Hence it may be established that there exists a need for performing repairs of wheel hubs, and in particular for heavy commercial vehicles involving replacement of for instance wheel bearings. A problem that can arise during such an operation in accordance with known prior art is that there is a risk of dirt and impurities entering the wheel hub in connection with a replacement of the wheel bearings. This may in turn cause an operational breakdown that will require further repairs of the wheel hub.

SUMMARY OF THE INVENTION

An object of the invention is to provide an improved wheel bearing arrangement, in particular for heavy commercial vehicles, that allows the components making up a wheel hub to be replaced, thereby solving the above problems.

According to the present invention, this object is achieved by means of a bearing arrangement of the type described in the introduction and characterized in that it is utilized for support by making up a complete unit comprising a first seal and a second seal which are arranged on either side of the bearing rollers in advance. This delimits enclosed bearing spaces between the first seal and the bearing rollers, which bearing spaces have been filled with bearing grease in advance.

The object is also achieved by means of a wheel axle arrangement of the type described in the introduction, and which is utilized for said support by making up a complete unit where the inner roller bearing comprises (includes, but is not necessarily limited to) a first seal and a second seal which is arranged on either side of the first set of bearing rollers, in advance. This delimits enclosed bearing spaces between the first seal and the bearing rollers and between the second seal and the bearing rollers, respectively. The outer roller bearing comprises a third seal and a fourth seal which are arranged on either side of the second set of bearing rollers in advance. This delimits enclosed bearing spaces between the third seal and the bearing rollers and between the fourth seal and the bearing rollers respectively. The first, second, third and fourth enclosed bearing spaces have been filled with bearing grease in advance.

The invention achieves a number of advantages. Firstly, it is possible to arrange the invention as a combined bearing and sealing device that is manufactured in advance in order to allow simple assembly onto a wheel axle.

The fact that the seals are in place before assembly on an axle, and the fact that the bearing spaces are filled with bearing grease in advance, allows for a simple and cost effective assembly of a wheel hub onto a wheel axle. In this way it is possible to avoid a costly replacement of a complete wheel hub when only an individual component such as a wheel bearing has been damaged, which of course is an advantage with respect to the costs for service and maintenance. Hence the invention comprises an arrangement in the form of a complete preassembled unit that in itself has a very high degree of cleanness. This complete preassembled unit is arranged to be sealed in advance, allowing relatively simple assembly in connection with the repair of a wheel hub.

BRIEF DESCRIPTION OF THE DRAWING

In the following, the invention will be described in greater detail with reference to an embodiment which is shown in the attached drawing labeled as FIG. 1 and showing a partially cross-sectioned view of a rear axle provided with a sealing device according to the present invention.

DETAILED DESCRIPTION OF A PREFERRED EMBODIMENT

Figure 1:
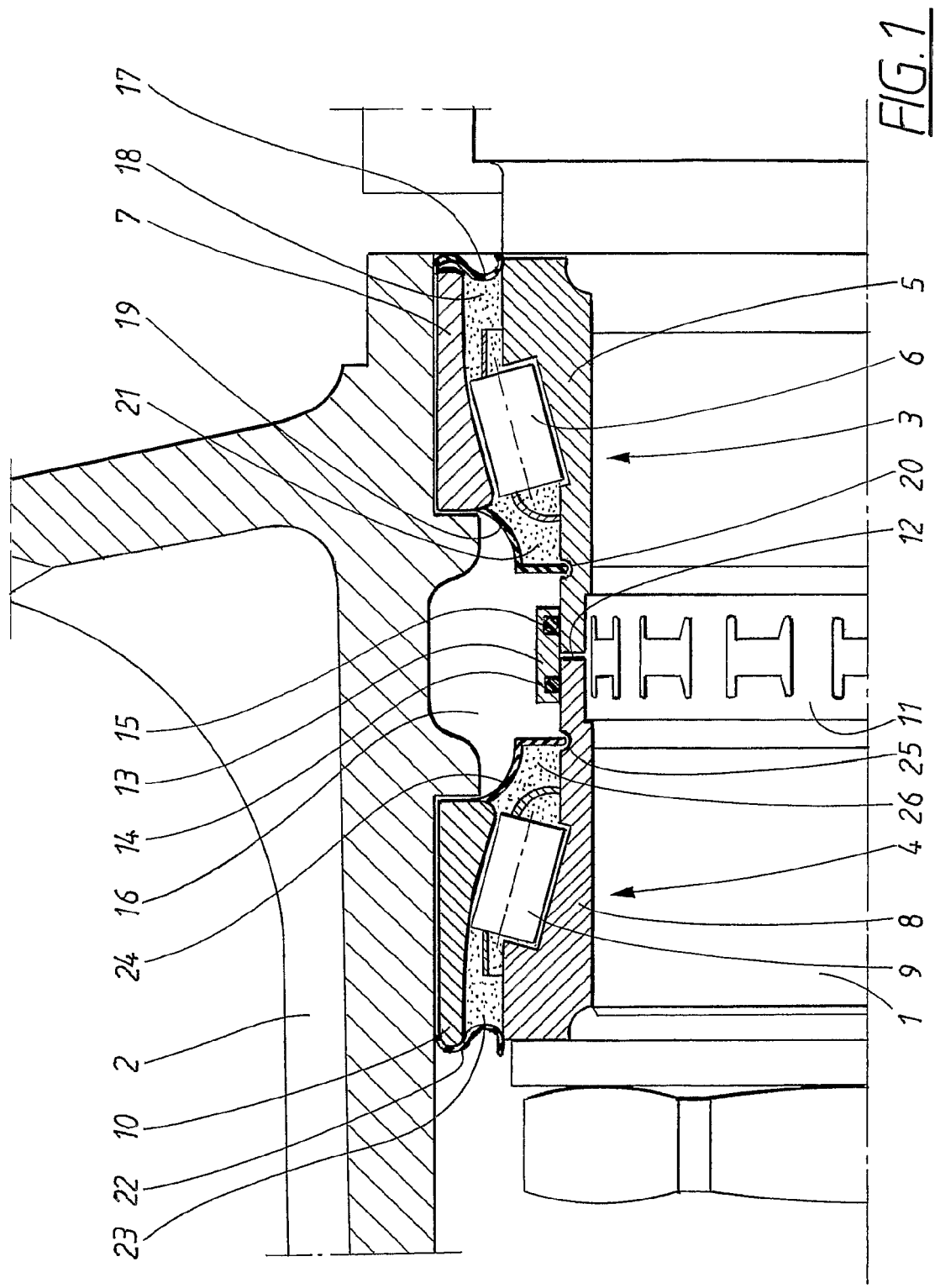

FIG. 1 shows an arrangement including a bearing arrangement according to the present invention. According to a preferred embodiment, the invention is provided in connection with a rear axle 1 in a motor vehicle, such as a commercial vehicle. The rear axle 1 is provided with a wheel hub 2 for at least one wheel (not shown). The wheel hub 2 is attached to the rear axle 1 via an inner roller bearing 3 and an outer roller bearing 4. The inner roller bearing 3 comprises a first inner race 5, a number of bearing rollers 6 and a first outer ring 7. Correspondingly, the outer roller bearing 4 comprises a second inner race 8, a number of bearing rollers 9 and a second outer ring 10. The roller bearings 3,4 according to this embodiment are conical roller bearings.

The first inner race 5 and the second inner race 8 are arranged to be mounted adjacent each other on the rear axle 1. In addition, the roller bearings 3,4 are fixed in a predetermined axial position on the rear axle 1 by means of a ring-shaped bearing clip 11. In operation the roller bearings 3,4 are arranged adjacent each other so that a space or gap 12 is formed between the end surfaces of the inner races 5,8 which are facing each other. This gap 12 may be sealed using a sealing device 13 of a type known from the patent publication WO 97/42425. The purpose of the sealing device 13 is to prevent oil from leaking through the gap 12 defined between the two inner races 5,8. For this purpose the sealing device 13 is suitably provided with two O-rings 14,15 of a substantially conventional type; that is, made from rubber or a similar material.

The two O-rings 14,15 are placed in sealing contact against the first inner race 5 and the second inner race 8. Hence the sealing device 13 with its O-rings 14,15 is placed in a space 16 between the two roller bearings 3, 4.

It should be noted that the invention is not limited to an embodiment comprising a sealing device 13 as described above, but is also applicable to other types of bearing arrangements, which for instance do not comprise such a sealing device.

According to what has been described above, oil may be supplied between a peripheral surface of the rear axle 1 and the inner surfaces of the respective inner races 5,8. The oil is successively fed from an oil reservoir (not shown), via an inner section of the rear axle 1 and towards the surfaces. The oil is used for corrosion protection for the rear axle 1 and the bearings 3,4 and is conveyed along the outside of the rear axles 1 in a groove (not shown) provided for this purpose and further between the peripheral surface of the rear axle 1 and the inner surfaces of the respective inner races 5,8.

The described embodiment is based on that each of the roller bearings 3,4 forms an integrated bearing arrangement intended to be mounted on the wheel axle 1 as a complete unit. In order to explain the invention, the inner roller bearing and its function will be described in further detail. It should first be noted that the inner roller bearing 3 is provided with a first seal 17 that preferably comprises an edge that encloses the inner edge (that is to the right in the figure) of the first outer race 7. Further, the first seal 17 is placed axially inside the bearing rollers 6 of the inner roller bearing 3 and extends towards the inner side of the first inner race 5. In this way the first seal 17 delimits and defines a first bearing space 18 together with the bearing rollers 6, the outer side of the first inner race 5 and the inner side of the first outer race 7. In addition, the end section of the first outer race 7 that faces the space 16 is provided with a second seal 19 that extends towards the inner side of the first inner race 5. According to this embodiment the second seal 19 is arranged to be locked in a groove 20 provided on the outer side of the first inner race 5. In this way a second bearing space 21 is defined, by means of the second seal 19, the bearing rollers 6 and the outer side of the first inner race 5. The first bearing space 18 and the second bearing space 21 are arranged to be filled with a suitable bearing grease during manufacture of the first roller bearing 3.

In a manner analogous with the inner roller bearing 3, the outer roller bearing 4 is provided with a third seal 22 that comprises an edge that encloses the outer end (that is to the left in the figure) of the second outer race 10. The third seal 22 extends up to the outer side of the second inner race 8 and is placed axially outside the bearing rollers 9 of the second roller bearing 4.

The third seal 22 delimits and defines a third bearing space 23 together with the bearing rollers 9, the inner side of the second outer race 10 and the outer side of the second inner race 8. In addition, the end section of the second outer race 10 that faces the space 16 is provided with a fourth seal 24 that extends towards the outer side of the second inner race 8. The fourth seal 24 is arranged to be locked in a further groove 25 provided on the outer side of the second inner race 8. In this way a fourth bearing space 26 is defined, by means of the fourth seal 24, the bearing rollers 9 and the outer side of the second inner race 8. As in the case of the first bearing space 18 and the second bearing space 21, the third bearing space 23 and the fourth bearing space 26 are arranged to be filled with a suitable bearing grease during manufacture of the second roller bearing 4.

The four seals 17,19,22,24 are made from a suitable material, such as plastic, steel sheet or rubber, and aims to define the above bearing spaces 18,21,23,26, which are substantially closed. As stated above the bearing spaces 18,21,23,26 are filled with a suitable type of bearing grease in connection with the manufacture and final assembly of the respective roller bearings. In this way the roller bearings 3,4 form complete and ready sealed wheel bearing units which can be mounted on a wheel axle without requiring any other preparation than a thorough cleaning of the axle before the wheel bearing is put in place. Hence the invention makes it possible to repair the wheel hub 2, for instance if either wheel bearing 3,4 has been damaged, and it is in other words not required to replace the entire wheel hub following such a damage.

When mounting the wheel bearings 3,4 on the rear axle 1, the inner wheel bearing 3 is assembled first. Subsequently the sealing device 13 is positioned on the inner wheel bearing 3, that is, on the first inner race 5. Then the inner races 5, 8 are assembled using the bearing clip 11. Assembly of the outer wheel bearing 4 is facilitated by the fact that the second outer race 10 extends slightly further in the axial direction (i.e. to the left in the figure) than the second inner race 8. Hence a suitable tool may be used to apply a sufficient force on the second outer ring 10 to press the outer wheel bearing 4 into place.

The present invention comprises a bearing arrangement formed on the basic principle that a wheel bearing of the above type can be provided as a compact, integrated and easily replaced unit. By providing the above mentioned bearing spaces 18,21,22,26 the bearing arrangement can be provided with bearing grease in advance and then be mounted on a wheel axle. In this way the invention allows a complete and pre-assembled unit to be formed, which unit has already been greased and assembled, that is, before the unit is mounted on a wheel axle as described above. In particular the first seal 17 and the second seal 19 are pre-assembled on either side of a set of bearing rollers 6. In addition, as can be seen from FIG. 1, the third seal 22 and the fourth seal 24 are also pre-assembled on either side of a set of bearing rollers 9. Further, the bearing spaces 18,21,23,26 defined between the seals and the bearing rollers are filled with bearing grease in advance. In this way a simple and efficient mounting of a bearing arrangement is facilitated, as it factually comprises a unit assembled into one piece.

The invention is particularly well suited for use in connection with conical roller bearings.

As can be seen from FIG. 1, the respective inner races 5,8 are each provided with a projection formed like a sleeve that extends axially beyond the second seal 19 and the fourth seal 24, respectively. In this way the two inner races 5, 8 define two opposing sleeve-like projections having an extension in the axial direction. The above-mentioned gap 12 is defined between the end sections of these projections. The gap 12 may in turn be sealed in a suitable manner by a sealing device 13.

The invention is not limited to the embodiments given above, but may be varied within the scope of the patent claims. For instance, the invention is not limited for use on rear axles for vehicles, but may also be used for other types of axles comprising greased bearings.

What is claimed is:

1. A bearing unit, comprising:
    a roller bearing having an inner race, bearing rollers, and an outer race;
    a first permanent seal extending from the inner race to the outer race on a first side of the bearing rollers so as to define a first permanently closed space between the inner race, the outer race, first ends of the bearing rollers, and the first permanent seal;
    a second permanent seal extending from the inner race to the outer race on a second side of the bearing rollers so as to define a second permanently closed space between the inner race, the outer race, second ends of the bearing rollers, and the second permanent seal;
    a quantity of bearing grease sealed within the first permanently closed space; and
    a quantity of bearing grease sealed within the second permanently closed space;
    wherein the bearing unit constitutes a permanently sealed, unitary or integrated, pre-assembled, stand-alone unit that is configured to facilitate eventual incorporation into a wheel assembly to support a wheel hub on a wheel axle.

2. The bearing unit as recited in claim 1, wherein said bearing rollers are conical bearing rollers.

3. A wheel axle assembly for a vehicle, comprising:
    a wheel axle;
    a first, axially inner bearing unit disposed on the wheel axle;
    a second, axially outer bearing unit disposed on the wheel axle; and
    a wheel having a hub which is rotationally supported on the axle by means of the first and second bearing units;
    wherein each of said first and second bearing units comprises
        a roller bearing having an inner race, bearing rollers, and an outer race;
        a first permanent seal extending from the inner race to the outer race on a first side of the bearing rollers so as to define a first permanently closed space between the inner race, the outer race, first ends of the bearing rollers, and the first permanent seal;
        a second permanent seal extending from the inner race to the outer race on a second side of the bearing rollers so as to define a second permanently closed space between the inner race, the outer race, second ends of the bearing rollers, and the second permanent seal;
        a quantity of bearing grease sealed within the first permanently closed space; and
        a quantity of bearing grease sealed within the second permanently closed space; and
    wherein each of said first and second bearing units constitutes a permanently sealed, unitary or integrated, pre-assembled, stand-alone unit.

4. The wheel axle assembly of claim 3, wherein the bearing rollers of the first and second bearing units are conical bearing rollers.

5. The wheel axle assembly of claim 3, wherein the first and second bearing units are arranged on the wheel axle in substantially mirror-symmetric fashion.

6. The wheel axle assembly of claim 5, wherein the inner race of each of said first and second bearing units has an extending portion that extends further in an axial direction than the respective outer race of the bearing unit, and wherein the bearing units are arranged with the extending portions of the inner races extending toward each other.

7. The wheel axle assembly of claim 6, wherein the extending portions of the inner races are spaced apart from each other with a gap between them.

8. The wheel axle assembly of claim 7, further comprising a sealing member that overlaps the extending portions of the inner races and seals the gap between them.

9. The wheel axle assembly of claim 5, further comprising a circumferentially extending clip member that is disposed on the axle between the first and second bearing units so as to maintain the first and second bearing units in spaced relation to each other.

10. The wheel axle assembly of claim 9, wherein the inner race of each of said first and second bearing units has an extending portion that extends further in an axial direction than the respective outer race of the bearing unit, and wherein the bearing units are arranged with the extending portions of the inner races extending toward each other and overlapping said clip member.

11. The wheel axle assembly of claim 5, wherein the inner race of each of said first and second bearing units has an extending portion that extends further in an axial direction than the respective outer race of the bearing unit; wherein the bearing units are arranged with the extending portions of the inner races extending toward each other; wherein the extending portions of the inner races are spaced apart from each other with a gap between them; wherein the wheel axle assembly further comprises a sealing member that overlaps the extending portions of the inner races and the seals the gap between them; wherein the wheel axle assembly further comprises a circumferentially extending clip member that is disposed on the axle between the first and second bearing units so as to maintain the first and second bearing units in spaced relation to each other; and wherein the bearing units are arranged with the extending portions of the inner races extending toward each other and overlapping said clip member.

* * * * *